United States Patent [19]

Okubo

[11] Patent Number: 5,028,095
[45] Date of Patent: Jul. 2, 1991

[54] ANTI-LOCK CONTROL METHOD AND SYSTEM FOR A VEHICLE

[75] Inventor: Satomi Okubo, Saitama, Japan

[73] Assignees: Akebono Brake Industry Co., Ltd., Tokyo, Japan; Akebono Research and Development Centre Ltd., Hanyu, both of Japan

[21] Appl. No.: 422,093

[22] Filed: Oct. 16, 1989

[30] Foreign Application Priority Data

Oct. 26, 1988 [JP] Japan ................. 63-268151

[51] Int. Cl.⁵ .................................. B60T 8/32
[52] U.S. Cl. ........................... 303/100; 188/181 A; 303/103; 303/105; 303/106; 303/109; 364/426.02
[58] Field of Search .............. 303/100, 105, 109, 110, 303/102, 103, 104, 106, 107, 108; 188/181 A, 181 R; 364/426.02

[56] References Cited

U.S. PATENT DOCUMENTS

| 4,668,022 | 5/1987 | Sato | 303/100 |
| 4,717,209 | 1/1988 | Hagiya et al. | 303/110 |
| 4,763,260 | 8/1988 | Sakuma et al. | 303/100 |
| 4,818,037 | 4/1989 | McEnnan | 303/109 |
| 4,849,890 | 7/1989 | Inoue et al. | 303/105 |

Primary Examiner—Douglas C. Butler
Attorney, Agent, or Firm—Cushman, Darby & Cushman

[57] ABSTRACT

The pressure increase of the brake hydraulic pressure starts again at a time point where the wheel speed, which has been decelerated due to an increase in the brake hydraulic pressure, recovers the speed due to the subsequent pressure decrease and holding of the brake hydraulic pressure and reaches the speed (Vv−Vx) which is lower than the computed vehicles speed Vv by a predetermined value $\Delta Vx$, where the predetermined value $\Delta Vx$ varies in accordance with the magnitude of the friction coefficient of the road surface.

7 Claims, 5 Drawing Sheets 5,028,095

ANTI-LOCK CONTROL METHOD AND SYSTEM FOR A VEHICLE

FIELD OF THE INVENTION

The present invention relates to an anti-lock control method for preventing locking of wheels at the time of braking operation of the vehicle.

BACKGROUND OF THE INVENTION

In general, with an anti-lock control device for a vehicle, anti-lock control is effected by means of a microcomputer such that hold valves and decay valves are opened and closed on the basis of electrical signals representing wheel speeds detected by wheel speed sensors, thereby increasing, holding or decreasing the brake hydraulic pressure, for the purpose of securing improved steering performance and running stability, while at the same time reducing the braking distance of the vehicle.

FIG. 1 shows control state diagrams as disclosed in U.S. Pat. No. 4,741,580 which illustrate the changes in the wheel speed $Vw$, the wheel acceleration and deceleration $\overline{V}w$ and the brake hydraulic pressure $Pw$, as well as a hold signal HS and a decay signal DS for opening and closing the hold valves and the decay valves.

In a state of the vehicle in running where no brake is operated, the brake hydraulic pressure $Pw$ is not increased and both of the hold signal HS and the decay signal DS are in the off-state, so that the hold valve is in the open state whereas the decay valve is in the closed state. However, with a brake operation, the brake hydraulic pressure $Pw$ increases rapidly from time point t0 (normal mode), reducing the wheel speed $Vw$. There is set up a reference wheel speed $Vr$ which is lower by a predetermined amount $\Delta V$ than the wheel speed $Vw$ and follows the latter with such a speed difference. The reference wheel speed $Vr$ is set up so that when the wheel deceleration (negative acceleration) $\overline{V}w$ of the wheel attains a predetermined threshold value, $-1G$, for instance, at a time point t1, it decreases linearly in time from the time point t1 with a slope $\theta$ for the deceleration of $-1G$.

At a time point t2 when the wheel deceleration $\overline{V}w$ reaches a predetermined value $-Gmax$ with maximum absolute value, the hold valve closes by turning on the hold signal HS to hold the brake hydraulic pressure $Pw$.

With the holding of the brake hydraulic pressure $Pw$ in such a manner, the wheel speed $Vw$ further decreases to become less than the reference wheel speed $Vr$ beyond a time point t3. At that time point t3 the decay signals DS is turned on to open the decay valve to start reducing the brake hydraulic pressure $Pw$. As a result of the pressure reduction, the wheel speed $Vw$ is shifted from decrease to increase at a time point t4 when a low peak $Vl$ of the wheel speed $Vw$ occurs. At the time point t4 of the low peak, the decay signal DS is turned off to close the decay valve, so that the reduction of the brake hydraulic pressure $Pw$ is completed and the brake hydraulic pressure $Pw$ is held at the value at that time.

Next, when the wheel speed $Vw$ attains a high peak $Vh$ at a time point t7, an increase in the brake hydraulic pressure takes place again. The pressure increase in the brake hydraulic pressure $Pw$ and the decrease in the wheel speed $Vw$ in this stage is arranged to take place gradually by a repetition of turning on and off of the hold signal HS mincingly. Starting at a time point t8 (corresponding to t3) a decompression mode is generated again.

It is to be noted that during the above operation, a time point t5 at which the wheel speed $Vw$ is recovered to a speed $Vb$ ($=Vl+0.15Y$) where $Vl$ is the wheel speed at the low peak and $Y$ is the difference between the wheel speed $Va$ at the time point t3 and the low peak speed $Vl$, so that $Vb$ represents the wheel speed at which 15% of the speed difference $Y$ is gained from the low peak value $Vl$, and a time point t6 at which the wheel speed increases to $Vc$ ($=Vl+0.8Y$) where 80% of the speed difference $Y$ is gained from the low peak speed $Vl$, are detected. Further, the interval $Tx$ of the first pressurization which starts at the time point t7 is determined by the judgment on the friction coefficient $\mu$ of the road surface as obtained based on the computation of the average acceleration $(Vc-Vb)/\Delta T$ for the period $\Delta T$ between the time point t5 and t6. In addition, the holding periods or the pressurization periods that follow are determined based on the vehicle deceleration $\overline{V}w$ that are detected immediately before each holding or pressurization. Through a combination of augmentation, holding and reduction of the brake hydraulic pressure $Pw$ as described in the above, it is possible to reduce the vehicle speed by controlling the wheel speed $Vw$ without causing the locking of the wheels.

Now, as is clear from FIG. 1, in the conventional anti-lock control method, the brake hydraulic pressure $Pw$ increases again at the time point t7 where the wheel speed $Vw$ that has once been decelerated due to an increase in the brake hydraulic pressure $Pw$ recovers the speed by the subsequent decrease and holding of the brake hydraulic pressure $Pw$ and attains the high peak. However, when the pressure increase is started from the time point t7 of the high peak, the pressure increase tends to lag when the vehicle is on a road with high value of the friction coefficient $\mu$, thereby causing a drawback that the braking distance is increased. At the same time, on a road with low value of the friction coefficient $\mu$, a pressure increase starts even when the wheel speed $Vw$ is shifted temporarily from acceleration to deceleration before the wheel speed $Vw$ is fully recovered. Therefore, there was a drawback in that the wheel speed $Vw$ drops further deep to generate a locking of the wheels.

In view of the foregoing drawbacks, there has been proposed to start the pressure increase, not at the high peak point of the wheel speed $Vw$ but rather at the time point where the wheel speed $Vw$ attains $(Vv-\Delta V)$ which is the speed lower by a predetermined value $\Delta V$ than the computed vehicle speed $Vv$. However, when the starting point of pressure increase is advanced in this manner, there still has a problem that the starting point of the pressure increase is too premature, giving rise to an excessively pressure increased state, if, for example, the road surface condition is changed suddenly from that of a high friction coefficient $\mu$ value to that of a low $\mu$ value.

SUMMARY OF THE INVENTION

It is, therefore, the object of the present invention to provide an anti-lock control method for a vehicle which can deal with a sudden change in the friction coefficient $\mu$ of the road surface.

The foregoing object can be achieved by a provision of an anti-lock method and system in which, according to the present invention, the pressure increase of the brake hydraulic pressure $Pw$ starts again at a time point where the wheel speed Vw, which has been decelerated due to an increase in the brake hydraulic pressure Pw, recovers the speed due to the subsequent pressure decrease and holding of the brake hydraulic pressure Pw and reaches a speed (Vv−ΔVx) which is lower than the computed vehicle speed Vv by a predetermined value ΔVx, where the predetermined value ΔVx varies in accordance with the magnitude of the friction coefficient $\mu$ of the road surface.

The value of Vx is arranged to vary to be small when the friction coefficient $\mu$ of the road surface is low, and large when the friction coefficient $\mu$ of the road surface is high.

DESCRIPTION OF THE PREFERRED EMBODIMENT

Figure 1:
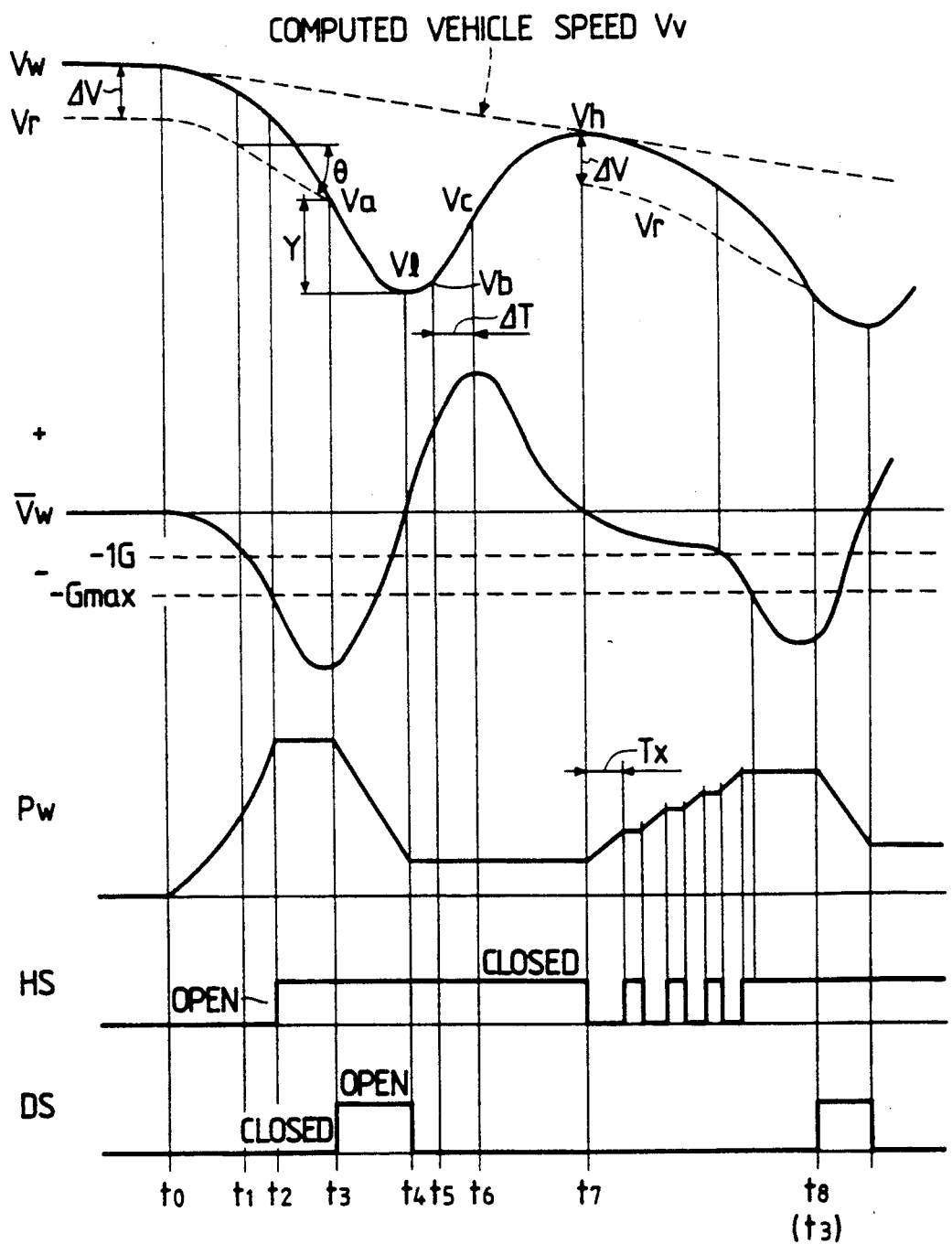
FIG. 1 is a timing chart in the conventional anti-lock control method.

Referring to the drawings, an embodiment of the present invention will now be described in detail.

Figure 2:
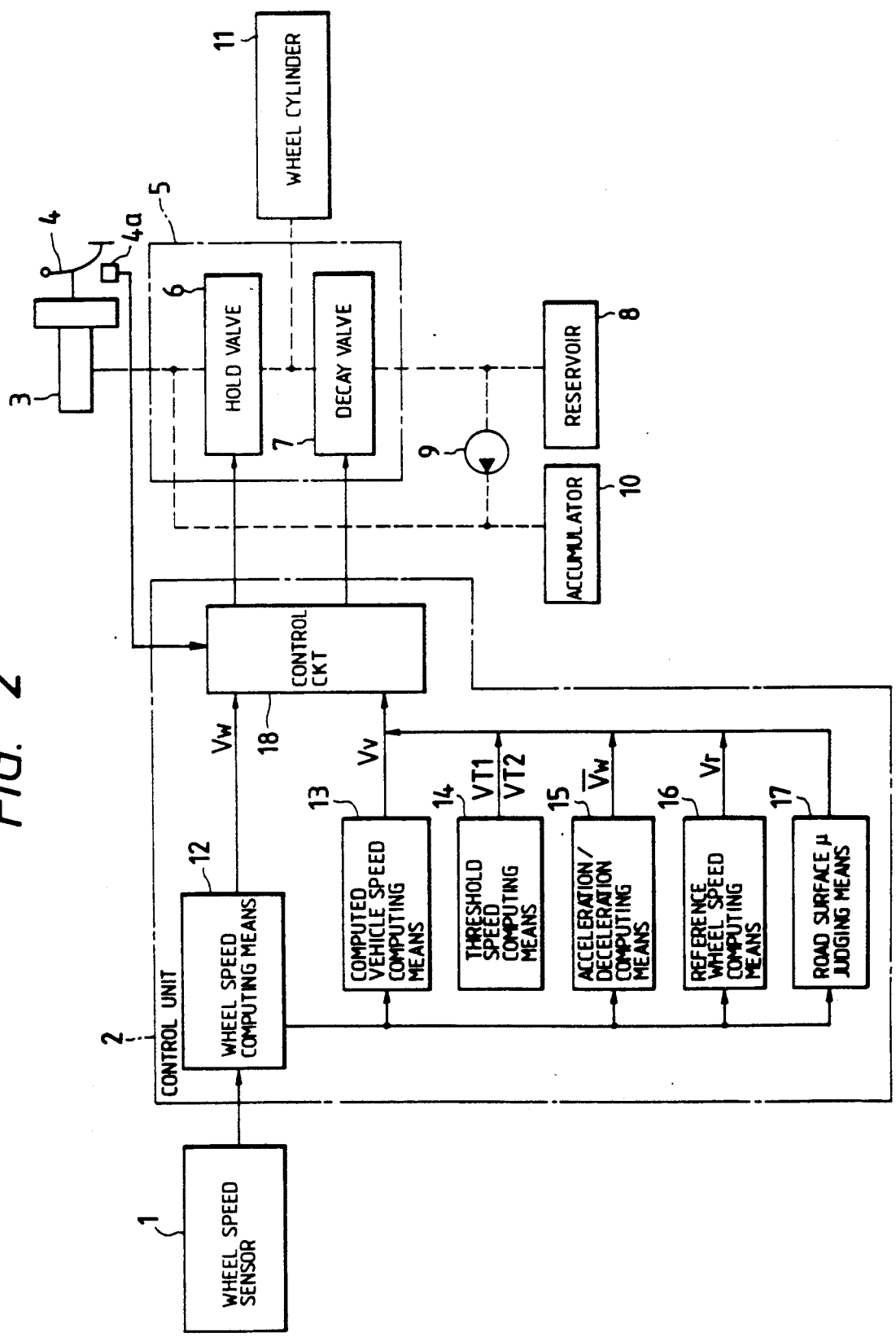
FIG. 2 is a block diagram for a control system to be used for executing an anti-lock control of the present invention.

FIG. 2 is a block diagram for a control system in the case of carrying out the embodiment. In FIG. 2, a wheel speed sensor 1 is provided for each of the four wheels, a control unit 2 consists of a microcomputer, a master cylinder 3 is operated by a brake pedal 4, a modulator 5 includes a hold valve 6 which is a normally-open type solenoid valve and a decay valve 7 which is a normally-closed type solenoid valve, a reservoir 8 contains therein the brake fluid which is pumped out by a pump 9 to be stored in an accumulator 10. Further, the system in FIG. 2 has a brake switch 4a which is closed by stepping on the brake pedal 4, and a wheel cylinder 11 of the braking device for the wheel.

The control unit 2 includes speed computing means 12 for computing the wheel speed Vw from the output of each wheel speed sensor 1, computed vehicle speed computing means 13 which selects the highest wheel speed (select high) out of the four wheel speeds Vw, and obtains a computed vehicle speed Vv through filters with acceleration/deceleration ±1G, and threshold value computing means 14 for computing a first threshold speed $VT_1$ and a second threshold speed $VT_2$ that follow the computed vehicle speed with respective predetermined speed differences (Vv>$VT_1$>$VT_2$). Moreover, the control unit 2 includes acceleration/deceleration computing means 15 for computing the acceleration/deceleration $\overline{V}w$ of the wheel speed Vw, and reference speed computing means 16 for computing a reference speed Vr which decreases, when the deceleration of the wheel speed Vw reaches a predetermined deceleration (−1G, for instance) linearly with the deceleration of −1G from the speed which is lower than the wheel speed Vw by a predetermined value ΔV, and road surface friction coefficient $\mu$ judging means 17. Further, a control circuit 18 is constructed so as to execute increase, holding and decrease of the brake hydraulic pressure within the wheel cylinder by controlling the opening and closing of the hold valve 5 and the decay valve 6 based on the outputs from the means 12 to 17.

Figure 3:
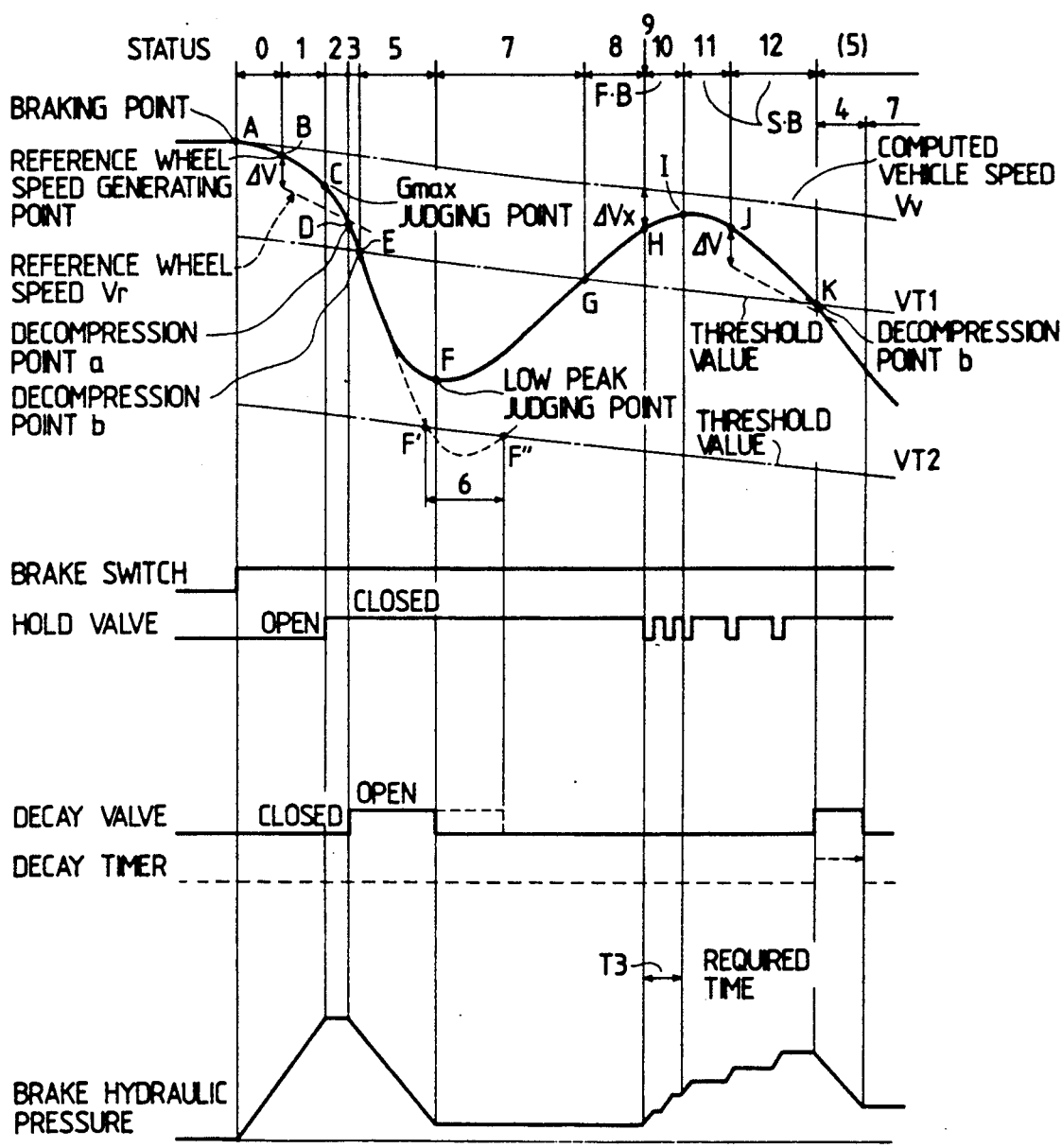
FIG. 3 is a timing chart for the control according to the invention.
Figure 4:
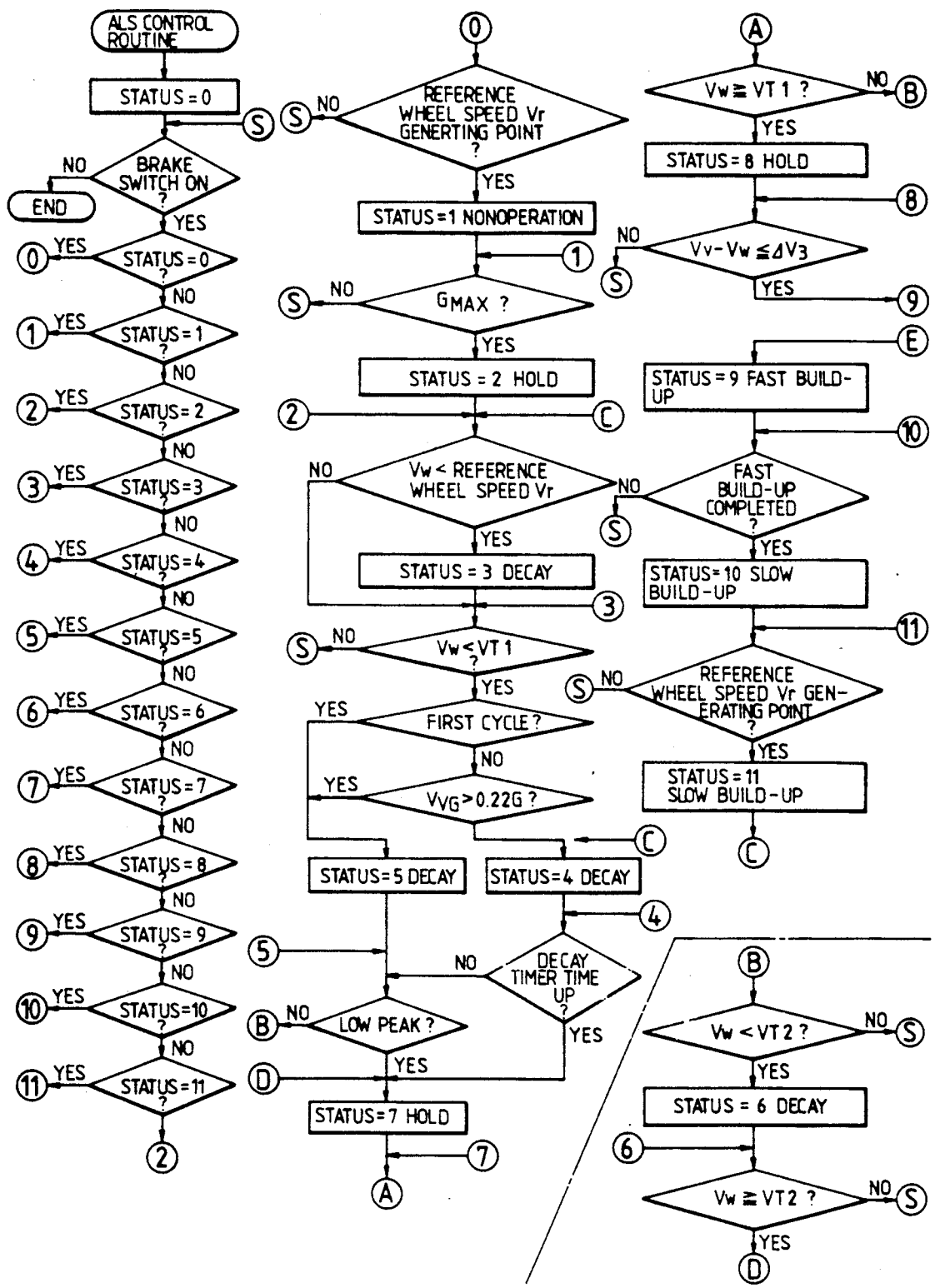
FIG. 4 and FIG. 5 are flow charts explaining each status shown in FIG. 3.
Figure 5:
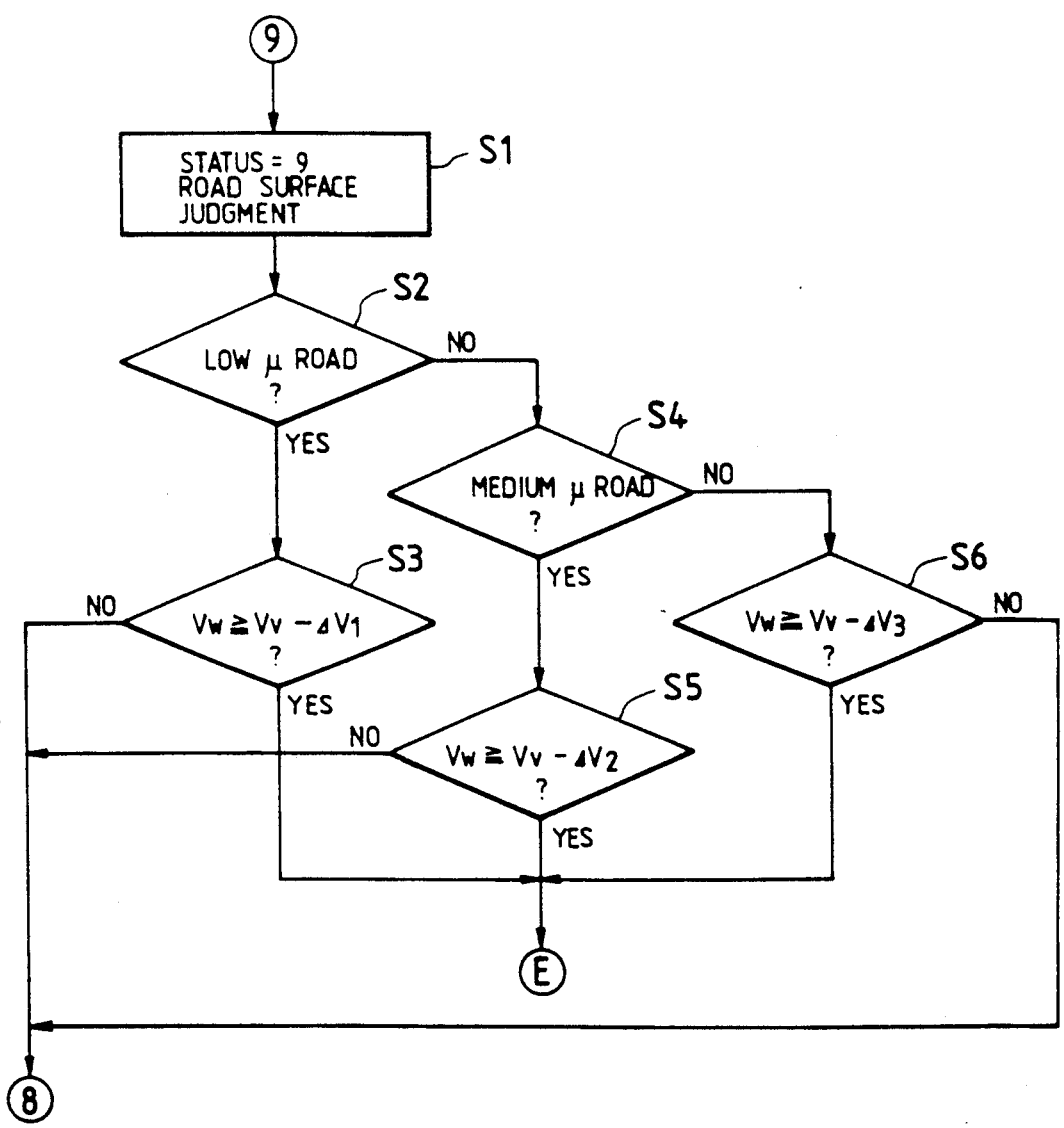

Referring to FIG. 3 showing timing chart for control in each of the status and FIG. 4 and FIG. 5 showing control flowcharts, an example of the anti-lock control in accordance with the present invention will be illustrated.

Here, the control of the brake hydraulic pressure of the present invention will be carried out in the case, for example, of a vehicle equipped with a dual circuit brake system of X-piping type, in which the left-front wheel and the right-rear wheel are grouped to form one system and the right-front wheel and the left-rear wheel are grouped to form the other system, and the modulator 5 belonging to each system is controlled by using the wheel speed on the lower speed side in the system as the wheel speed (system speed) to be controlled for the system.

[Status 0]

This status is defined as the interval from a time point A at which the brake switch 4a is closed by stepping on the brake pedal 4 to a time point B at which there is generated a reference wheel speed Vr which decreases linearly as a result of attaining a predetermined deceleration (−1G, for example) by the deceleration $\overline{V}w$ of the wheel speed Vw. The hold valve 6 is in the open state while the decay valve is in the closed state, so that the brake hydraulic pressure within the wheel cylinder 11 rises by the brake fluid supplied from the master cylinder 3.

[Status 1]

This status is defined to cover the period from the time point B of the generation of the reference speed Vr to a time point C at which it is judged that the deceleration $\overline{V}w$ of the wheel speed attains a predetermined deceleration Gmax. In this status the hold valve 6 and the decay valve 7 are nonoperative.

[Status 2 (Holding)]

This status is defined to cover the period from the time point C of judging Gmax to the time point whichever may be the earlier between the time point at which the wheel speed Vw is about to be taken over by the reference speed Vr (decompression point a) and the time point at which the wheel speed Vw is about to be taken over by the first threshold speed $VT_1$ (decompression point b). The hold valve 6 closes at the time point C, and the brake hydraulic pressure is held during the status. In FIG. 3 Status 2 is shown to terminate at the time point D at which the wheel speed Vw is about to be overtaken by the reference wheel speed Vr. However, if the wheel speed Vw is to be overtaken by the first threshold speed $VT_1$ prior to the time point D, Status 2 will be terminated at that time point.

[Status 3 (Decompression)]

This status is defined to cover the period from the time point D at which the wheel speed Vw is about to be overtaken by the reference wheel speed Vr to a time point E at which the wheel speed Vw is about to be overtaken by the first threshold speed $VT_1$. The decay valve 7 opens at the time point D, and a decompression of the brake hydraulic pressure will be started.

[Status 4 (Decompression)]

This status occurs when the control cycle is in a second or later cycle and the absolute value of the deceleration VvG of the computed vehicle speed Vv is lower than −0.22G. Status 4 is defined to last from the time at which the wheel speed Vw is overtaken by the first threshold speed $VT_1$ to the time when one of the following conditions is satisfied.

(1) When a decay timer which is set at the start of the decompression in order to prevent an excessive decompression counts up its time.
(2) When the wheel speed Vw is about to be overtaken by the second threshold speed $VT_2$.
(3) When the wheel speed Vw is judged to have attained a low peak.

[Status 5 (Decompression)]This status occurs when the control cycle is in a first cycle or when the absolute value of the deceleration VvG of the computed vehicle speed Vv is greater than $-0.22G$. Status 5 is defined to cover the period from time E at which the wheel speed Vw is about to be overtaken by the first threshold speed $VT_1$ to the time whichever is the earlier between a time point F at which the wheel speed Vw is judged to have attained a low peak and a time point F' at which the wheel speed Vw is about to be overtaken by the second threshold speed $VT_2$ as shown by the broken line in FIG. 3.

[Status 6 (Decompression)]
This status is defined to extend over the period where the wheel speed Vw is smaller than the second threshold speed $VT_2$, namely, from the time point F' to the time point F" in FIG. 3.

[Status 7 (Holding)]
The condition for the start of this Status 7 is considered to satisfy either one of the following conditions.
(1) When a low peak is judged in Status 4 or 5.
(2) When the decay timer counts up its time in Status 4.
(3) When the wheel speed Vw is about to overtake the second threshold speed $VT_2$ in Status 6 (time point F").

Status 7 is defined to cover the period from the time point at which one of the above conditions is satisfied to a time point G at which the wheel speed Vw is about to overtake the first threshold speed $VT_1$.

If in the condition of Status 7 the wheel speed Vw fails to overtake the first threshold speed $VT_1$ after the elapse of a predetermined time $T_1$, it goes to Status 4 and carries out a decompression again.

[Status 8 (Holding)]
This status is defined to cover the period from a time point G at which the wheel speed Vw is about to overtake the first threshold speed $VT_1$ to a time point H of the Status 9 (explained below) at which a starting point for increasing the brake hydraulic pressure Pw by judging the friction coefficient $\mu$ of the road surface.

[Status 9 (Setting Starting Point for Increasing Pressure)]
In this status the road surface judgement and the setting of the starting point for increase of the brake hydraulic pressure by the determination of the value for $\Delta Vx$ based on the road surface judgment executed as shown in FIG. 5. As the values for $\Delta Vx$, $\Delta V_1$ to be applied to the road surface with a low $\mu$ value, $\Delta V_2$ to be applied to the road surface with a medium $\mu$ value, and $\Delta V_3$ to be applied to the road surface with a high $\mu$ value, satisfying the condition $\Delta V_1 < \Delta V_2 < \Delta V_3$, are prepared in advance.

First, in step $S_1$, the road surface judgment is carried out at a time point where the difference between the computed vehicle speed Vv and the wheel speed Vw and the wheel speed Vw becomes equal to the maximum $\Delta Vx$, namely, $\Delta V_3$. In the next step $S_2$, when it is judged that the road surface has a low friction coefficient $\mu$ value, $\Delta Vx$ is decided to be the minimum value $\Delta V_1$ in step $S_3$, shifted to Status 10 from the time point at which the wheel speed Vw is about to overtake the speed $(Vv - \Delta V_1)$, and starts a fast build-up of the pressure. When it is judged in step $S_2$ that the road surface has a medium $\mu$ value or a high $\mu$ value, it proceeds to step $S_4$. When it is judged to have a medium $\mu$ value in step $S_4$, $\Delta Vx$ is decided to be $\Delta V2$ in step $S_5$, shifted to Status 10 at the time point where the wheel speed Vw is about to overtake the speed $(Vv - \Delta V_2,)$, and starts a fast build-up of the pressure. Further, when it is judged to have a high $\mu$ value in step $S_4$, $\Delta Vx$ is decided to be the maximum $\Delta V_3$ in step $S_6$, shifted to Status 10 at the time point where the wheel speed Vw is about to overtake the speed $(Vv - \Delta V_3)$, and starts a fast build-up of the pressure.

The judgement of the friction coefficient $\mu$ of the road surface can be accomplished based on the calculation of the average acceleration $(Vc - Vb)/\Delta T$ over the period $\Delta T$ between the time points $t_5$ and $t_6$ in FIG. 1, or may be performed by providing a deceleration detecting sensor on the body of the vehicle.

It is to be noted that if the wheel speed Vw fails to overtake the speed $(vv - \Delta Vx)$ even after the elapse of a predetermined time $T_2$ in Status 8, it is shifted to Status 12, and a slow build-up (explained later) of the pressure is started there.

[Status 10 (Fast Build-Up)]
This status is defined to cover the period from the time point H at which the wheel speed Vw is about to overtake the speed $(Vv - \Delta Vx)$ to a time point I after the elapse of a predetermined time $T_3$. In this status, the brake hydraulic pressure is built up relatively rapidly by opening and closing the hold valve 6 mincingly.

[Status 11 (Slow Build-Up)]
This status is defined to cover the period from the time point I at which the fast build-up of the pressure in Status 10 is completed to the time point J at which the reference wheel speed Vr is to be generated. In Status 11, the brake hydraulic pressure is built up slowly by closing and opening of the hold valve 6 in which the closing time is prolonged.

[Status 12 (Slow Build-Up)]
This status is defined to cover the period from the time point J at which the reference speed Vr is generated to the time point whichever is the earlier between the time point at which the wheel speed Vw is about to be overtaken by the reference wheel speed Vr or the time point at which the wheel speed Vw is about to be overtaken by the first threshold speed $VT_1$. In other words, although Status 12 is shown to be completed in FIG. 3 at a time point K where the wheel speed Vw is about to be overtaken by the first threshold speed $VT_1$, if the wheel speed Vw is overtaken by the reference speed Vr prior to the time point K, then Status 12 would have been completed at that time point. When Status 12 is completed, it goes back to Status 4 or Status 5.

In the present invention, numerous statuses are set and the control is executed by distinctly dividing the state to each status, so that it is possible to perform an optimum anti-lock control for all conceivable circumstances.

In addition, in accordance with the present invention, it is arranged to delay the starting point of increasing the brake hydraulic pressure on a road surface with a low value of the friction coefficient $\mu$ and the starting point of increasing the pressure is advanced on a road surface with high μ value, so that it becomes possible to perform a stabilized anti-lock control.

Moreover, in accordance with the present embodiment, there are set a reference wheel speed Vr which determines the starting time of decreasing the brake hydraulic pressure, as well as a first threshold speed $VT_1$ and a second threshold speed $VT_2$ with reference to a computed vehicle speed Vv. By so doing, pressure decrease is arranged to be started at the time when the wheel speed is about to be overtaken by the first threshold speed $VT_1$ even when the wheel speed Vw is decelerated slowly, so that it is possible to obtain always a stabilized starting point for pressure decrease. In contrast, when the wheel speed Vw is decelerated rapidly, the starting point of decreasing the pressure is taken at the time point when the wheel speed Vw is about to be overtaken by the reference wheel speed Vr, so that the pressure decrease can be started without delay. Moreover, the state in which the wheel speed Vw is less than the second threshold speed is set to be the region for decreasing the pressure. Therefore, even when the friction coefficient μ of the road surface changes suddenly from a high value to a low value, there can be secured a sufficiently long time for pressure decrease after entering the region of the low μ value so that it is possible to prevent the locking of the wheels in an effective manner.

What is claimed is:

1. An anti-lock control method for preventing the locking of vehicle wheels at the time of braking by the repetitive increase and decrease of the brake hydraulic pressure in a responsive motion to electrical signals, the control method comprising the steps of:

setting a computed vehicle speed Vv based on the largest wheel speed Vw among all of the wheel speeds at the time of braking;

starting to increase again the brake hydraulic pressure from a time point at which the wheel speed that has been decelerated by an increase of the brake hydraulic pressure is recovered as a result of an ensuing decrease and holding of the hydraulic pressure to the speed $(Vv - \Delta Vx)$ which is lower than said computed vehicle speed Vv by a first predetermined value $\Delta Vx$, said first predetermined value $\Delta Vx$ being arranged to be varied in response to a magnitude of a friction coefficient of a road surface, said ensuing decrease and holding of the brake hydraulic pressure being initiated at a starting point that was determined by comparing wheel speed Vw with a reference wheel speed Vr, said reference wheel speed Vr decreasing linearly with deceleration of said wheel speed Vw from wheel speed Vw minus a second predetermined value $\Delta V$.

2. The anti-lock control method as claimed in claim 1, wherein said first predetermined value $\Delta Vx$ is varied so as to be small when the friction coefficient of the road surface is low, and to be large when the friction coefficient of the road surface is high.

3. The anti-lock control method as claimed in claim 2, wherein said first predetermined value $\Delta Vx$ is a first value $\Delta V1$ to be applied when the friction coefficient of the road surface is low, wherein said first predetermined value $\Delta Vx$ is a second value $\Delta V2$ to be applied when the friction coefficient is medium, and wherein said first predetermined value $\Delta Vx$ is a third value $\Delta V3$ to be applied when the friction coefficient is high, the first, second and third values satisfying the condition $\Delta V1 < \Delta V2 < \Delta V3$.

4. The anti-lock control method as claimed in claim 1, wherein the judgement of said friction coefficient of the road surface is based on the result of calculation of the average acceleration over a predetermined period after the wheel speed is recovered to a prescribed value subsequent to its attaining a low peak due to a decrease of the brake hydraulic pressure.

5. The anti-lock control method as claimed in claim 1, wherein the control of increase and decrease of the brake hydraulic pressure is executed, in the case of a vehicle equipped with a dual circuit X-piping type brake system, by grouping the front-left wheel and the rear-right wheel as one circuit and the front-right wheel and the rear-left wheel as the other circuit and controlling the modulator belonging to each system by using the lower wheel speed in the system as the wheel speed to the controlled (system speed) for the system.

6. An anti-lock control system for a vehicle having a master cylinder and a plurality of wheels each having a wheel cylinder, the system comprising:

means for storing a brake hydraulic pressure;

modulating means including a hold valve and a decay vale, for selectively supplying said brake hydraulic pressure to said wheel cylinder;

means for sensing a speed of each of the vehicle wheels, and means for controlling said modulating means in accordance with an output of said wheel speed sensing means, said controlling means including:

means for computing said wheel speed Vw;

means for computing a computed vehicle speed Vv based upon the largest one of said computed wheel speed at the time of braking operation;

means for computing a threshold speed based upon said computed wheel speed;

means for computing an acceleration/deceleration speed based upon said computed wheel speed;

means for computing a reference wheel speed Vr based upon said computed wheel speed, said reference wheel speed Vr decreasing linearly with deceleration of said wheel speed Vw from wheel speed Vw minus a first predetermined value $\Delta V$;

means for judging a friction coefficient of a road on which the vehicle travels;

a control member for controlling said modulating means in accordance with said computed wheel speed, said computed vehicle speed, said threshold speed, said acceleration/deceleration speed, said reference wheel speed and said friction coefficient, said control member causing said brake hydraulic pressure in said modulating means to increase again from a time point at which said computed wheel speed that has once been decelerated by an increase of said brake hydraulic pressure is recovered as a result of the ensuing decrease and holding of said hydraulic pressure to a speed $(Vv - \Delta Vx)$ which is lower than said computed vehicle wheel speed Vv by a second predetermined value $\Delta Vx$, said ensuing decrease and holding of the brake hydraulic pressure being initiated at a starting point, said starting point being determined by comparing wheel speed Vw with said reference wheel speed Vr; and means for varying said second predetermined value $\Delta Vx$ in response to a magnitude of said friction coefficient of the road surface.

7. The anti-lock control system of claim 6, wherein said value for $\Delta Vx$ is varied so as to be small when said friction coefficient of the road surface is low, and to be large when said friction coefficient of the road surface is high.

* * * * *